United States Patent
Steinmeyer

(10) Patent No.: US 6,536,218 B1
(45) Date of Patent: Mar. 25, 2003

(54) SUPRACONDUCTING DEVICE COMPRISING A COOLING UNIT FOR A ROTATING SUPRACONDUCTIVE COIL

(75) Inventor: Florian Steinmeyer, Witney (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/049,688

(22) PCT Filed: Aug. 10, 2000

(86) PCT No.: PCT/DE00/02685
§ 371 (c)(1),
(2), (4) Date: Feb. 15, 2002

(87) PCT Pub. No.: WO01/13049
PCT Pub. Date: Feb. 22, 2001

(30) Foreign Application Priority Data

Aug. 17, 1999 (DE) .......................... 199 38 986

(51) Int. Cl.$^7$ .............................. F25B 19/00; F25B 9/00
(52) U.S. Cl. ................. 62/6; 62/50.1; 62/505; 310/52
(58) Field of Search .............. 62/50.1, 505, 6; 310/52, 54

(56) References Cited

U.S. PATENT DOCUMENTS

| | | | |
|---|---|---|---|
| 4,048,529 A | | 9/1977 | Pomeroy et al. |
| 4,079,273 A | | 3/1978 | Lambrecht et al. |
| 4,194,137 A | * | 3/1980 | Vinokurov et al. ........... 62/505 |
| 4,289,986 A | * | 9/1981 | Kullmann ................. 62/505 |
| 4,300,066 A | * | 11/1981 | Butler, III .................. 62/48.1 |
| 4,309,632 A | * | 1/1982 | Muller et al. ................. 310/52 |
| 4,358,937 A | * | 11/1982 | Okamoto et al. ............. 62/505 |
| 4,364,241 A | * | 12/1982 | Okamoto et al. ............. 62/505 |
| 4,365,479 A | * | 12/1982 | Weghaupt et al. ............ 62/505 |
| 4,448,042 A | * | 5/1984 | Yamaguchi et al. .......... 62/505 |
| 5,335,505 A | | 8/1994 | Ohtani et al. |
| 5,482,919 A | | 1/1996 | Joshi |

FOREIGN PATENT DOCUMENTS

| | | |
|---|---|---|
| GB | 1312698 | 4/1973 |
| WO | 00/13296 | 3/2000 |

OTHER PUBLICATIONS

"A Cryocooler Cooled 10.7T Superconducting Magnet with a Room Temperature Bore of 52mm," Kazunor Jikihara et al., ICEC16/ICMC Proceedings, pp. 1109–1129.
"Advances in Cryocoolers," Ray Radebaugh, ICEC16/ICMC Proceedings, pp. 33–44.
"Double inlet pulse tub refrigerators an important improvement,"Zhu Shaowei, et al., *Cryogenics*, vol. 30, pp. 514–520, Jun. 1990.
"A two–stage pulse tube cooler operating below 4K," C. Wang et al., *Cryogenics*, vol. 37, No. 3, pp. 159–164, 1997.
"Stirling–Maschinen–Technik", Kai Schiefelbein et al., *Grundlagen, Konzepte und Chancen*, pp. 338–356 Aug. 1996.
"Development of a helium transfer coupling for a superconducting generating rotor," B. B. Gamble, *Advances in Cryogenic Engineering*, vol. 23, pp. 125–139, 1978.

* cited by examiner

Primary Examiner—Ronald Capossela
(74) Attorney, Agent, or Firm—Harness Dickey & Pierce PLC

(57) ABSTRACT

A superconducting device includes a winding including superconductor material, which can be rotated about a rotation axis. For indirect cooling of the winding, a regenerative cryocooler having a co-rotating cold head and including a compressor unit is provided, as well as, in between, a transfer unit including a gas coupling for conveying a working gas between the stationary and rotating parts. The working gas is delivered to the cold head directly after the gas coupling.

20 Claims, 4 Drawing Sheets

SUPRACONDUCTING DEVICE COMPRISING A COOLING UNIT FOR A ROTATING SUPRACONDUCTIVE COIL

This application is the national phase under 35 U.S.C. §371 of PCT International Application No. PCT/DE00/02685 which has an International filing date of Aug. 10, 2000, which designated the United States of America, the entire contents of which are hereby incorporated by reference.

FIELD OF THE INVENTION

The invention generally relates to a superconducting device having a rotor which is mounted so as to rotate about a rotation axis and contains a winding of conductors including superconductor material. Further, it may relate to a device including a refrigeration unit which is designed for a working gas and includes a cold head, which is arranged in the rotor and is thermally coupled to the winding for indirect cooling of the latter. The refrigeration unit can incude a stationary compressor unit located outside the rotor, as well as a transfer unit, arranged between the cold head and the compressor unit, having a sealing device for conveying the working gas between the stationary and rotating parts.

BACKGROUND OF THE INVENTION

A superconducting device is disclosed by U.S. Pat. No. 5,482,919 A.

Besides metallic superconductor materials which have been known for a long time, e.g. NbTi or $Nb_3Sn$, which have very low transition temperatures $T_c$ and are therefore also referred to as low-$T_c$ superconductor materials or LTS materials, metal oxide superconductor materials with transition temperatures above 77 K have been known since 1987. The latter materials are also referred to as high-$T_c$ superconductor materials or HTS materials, and in principle make it possible to employ a cooling technique using liquid nitrogen ($LN_2$).

Attempts are also being made to produce superconducting windings with conductors by using such HTS materials. It is found, however, that previously known conductors have only a comparatively low current-carrying capacity in magnetic fields with inductions in the tesla range. This frequently entails the requirement that, in spite of the inherently high transition temperatures of the materials which are used, the conductors of such windings nevertheless need to be kept at a temperature level below 77 K, for example between 10 and 50 K, so that significant currents can be carried with field strengths of a few tesla. Such a temperature level, on the one hand, is indeed significantly higher than 4.2 K, the boiling point of liquid helium (LHe), with which known metallic superconductor materials such as $Nb_3Sn$ are cooled. On the other hand, however, cooling with $LN_2$ is uneconomical because of the high conductor losses. Other liquefied gases such as hydrogen, with a boiling point of 20.4 K, or neon, with a boiling point of 27.1 K, are ruled out because of their hazardous nature or for lack of availability.

For the cooling of windings having HTS conductors, in the temperature range, it is therefore preferable to use refrigeration units in the form of cryocoolers with a closed pressurised He gas circuit, for example of the Gifford-McMahon or Stirling type, or as a so-called pulse tube cooler. Such refrigeration units also have the advantage that the refrigeration power is available almost at the touch of a button, and the need for the user to handle low-temperature liquids is obviated. When such refrigeration units are used, a superconducting device, such as e.g. a magnet coil or a transformer winding, is cooled only indirectly by heat conduction to a cold head of a refrigerator (cf. e.g. "Proc. $16^{th}$ Int. Cryog. Engng. Conf. (ICEC 16)", Kitakyushu, J. P., 20.–24.05.1996 pub. Elsevier Science, 1997, pages 1109 to 1129).

A corresponding cooling technique is also provided for the superconducting rotor, belonging to an electrical machine, which is disclosed by the US-A document cited in the introduction. The rotor contains a rotating winding of HTS conductors, which is to be kept at a desired operating temperature of between 30 and 40 K by way of a refrigeration unit designed as a Stirling or Gifford-McMahon or pulse tube cooler. To that end, in a particular embodiment, the refrigeration unit contains a co-rotating cold head (not explained further) whose colder side is thermally coupled to the winding indirectly via heat-conducting elements. The refrigeration unit of the known machine also contains a compressor unit, located outside its rotor, which delivers the required working gas to the cold head via a rotating coupling (not explained in detail) of a corresponding transfer unit. The coupling also supplies the necessary electrical energy, via two slip rings, to a valve mechanism of the refrigeration unit, which mechanism is integrated in the cold head. This concept entails the requirement that at least two gas connections need to be fed coaxially through the transfer unit and at least two electrical slip rings need to be provided. Accessibility of the co-rotating parts of the refrigeration unit and, in particular, of the valve mechanism in the rotor of the machine, is also impaired: it is therefore necessary to open the rotor housing when maintenance is required. The function of a conventional valve mechanism is also unreliable at fast rotation, as is the case with synchronous motors or generators.

SUMMARY OF THE INVENTION

It is an object of the present invention to develop a device which creates a reliable operation of the refrigeration unit, even at the rotational speeds, in a temperature range below 77 K with comparatively reduced equipment outlay.

This object is achieved by providing a superconducting device including a refrigeration unit. The superconducting device may include a rotor which is mounted so as to rotate about a rotation axis and a winding of conductors including superconductor material, as well as a refrigeration unit which is designed for a working gas and which includes at least one regenerative cryocooler. This cryocooler may have at least one cold head, which is arranged in the rotor and is thermally coupled to the winding for indirect cooling of the latter, and a stationary compressor unit located outside the rotor. The refrigeration unit also may include a transfer unit, arranged between the cold head and the compressor unit, having a sealing device and a gas coupling for conveying the working gas between the stationary and rotating parts, a direct connection for the working gas being provided between the gas coupling and the cold head.

In this context, the term "direct connection for the working gas" is intended to mean that, after the gas transfer from the stationary part to the rotating part of the transfer unit (or in the reverse direction) no other parts which are absolutely necessary for the function of the refrigeration device, in particular electrical control lines and optionally a valve mechanism, need to be provided between the transfer unit and the cold head.

In the inventive configuration of the superconducting device, the compressor side (optionally together with a valve mechanism which may be required) of the refrigeration unit can be arranged stationary outside the rotor, while the rotating coupling lies between the compressor side (and the optional valve mechanism) with the electrical terminals, on the one hand, and the cold head proper, on the other hand. It has been discovered that such a situation is possible if a regenerative cryocooler is selected for the refrigeration unit. In this context, the term "regenerative cryocooler" is intended to mean a cryocooler with a regenerator, or a regenerative working cycle, according to the standard classification of cryocoolers (cf. e.g. "Proc. 16$^{th}$ Int. Cryog. Engng. Conf. (ICEC 16)", Kitakyushu, J. P., 20.–24.05.1996, pub. Elsevier Science, 1997, pages 33 to 44). The number of gas connection lines leading to the cold head of such a cryocooler is then advantageously minimal.

Slip rings for electrical transmission may also be fully obviated. For instance, for a pulse tube cooler corresponding to said cryocooler type based on the principle with a second inlet, only a single gas feed to the rotor is necessary. Also, no mechanically moved parts are mounted on the rotor in this type, so that no maintenance work on the rotor is generally necessary either. The valve mechanism of the pulse tube cooler can be mounted at a suitable position outside the rotor, and is readily accessible for maintenance work.

Corresponding advantages are also obtained for the embodiment of a split Stirling cooler which makes do without a valve mechanism. It is hence preferable to select a pulse tube cooler or a split Stirling cooler as the regenerative cryocooler. This is because, with these cooler types, not only can said requirements concerning limited equipment outlay be readily satisfied; they are also to be regarded as sufficiently advanced with a view to use for rotating windings.

Advantageous refinements of the superconducting device according to the invention are given in the dependent claims.

For instance, the refrigeration unit may advantageously have a plurality of cold heads. Then, depending on the winding size, it is possible to achieve higher refrigeration powers. It is also possible to arrange these cold heads in such a way as to reduce possible imbalance problems of the rotor.

The cold head may, particularly advantageously, be designed in multiple stages. With its first stage, an electrical feed or a thermal radiation shield is then put at a comparatively higher intermediate temperature. With a correspondingly configured cold head, it is straightforward for different co-rotating parts to be kept respectively at a temperature level which is favorable for effective cooling.

It is also to be regarded as advantageous if the winding to be cooled, and therefore its superconducting material, is to be kept at a temperature below 77 K by way of the cold head and, in the case of using HTS material, preferably between 20 and 50 K. This is because, in this temperature range which can be maintained with comparatively limited refrigeration outlay, known HTS materials have a sufficient critical current density for customary applications.

It is also particularly advantageous if a vertical orientation of the rotation axis of the rotor is provided. With a corresponding orientation of the cold head, functionality can then be guaranteed even at high rotational speeds of the rotor, without entailing problems of space inside the rotor body relating to an extended cold head arrangement.

BRIEF DESCRIPTION OF THE DRAWINGS

The invention will be explained in more detail below with the aid of the drawing, in which FIG. 1 schematically shows a known pulse tube cooler with a cold head, FIG. 2 schematically shows a known split Stirling cooler with a cold head, FIG. 3 schematically shows the rotor of a superconducting device according to the invention with an associated refrigeration unit, and FIGS. 4 to 6 schematically show various embodiments of gas couplings that are suitable for the devices according to the invention.

In the figures, parts that correspond to one another are given the same reference numbers.

DETAILED DESCRIPTION OF THE PREFERRED EMBODIMENTS

Figure 1:
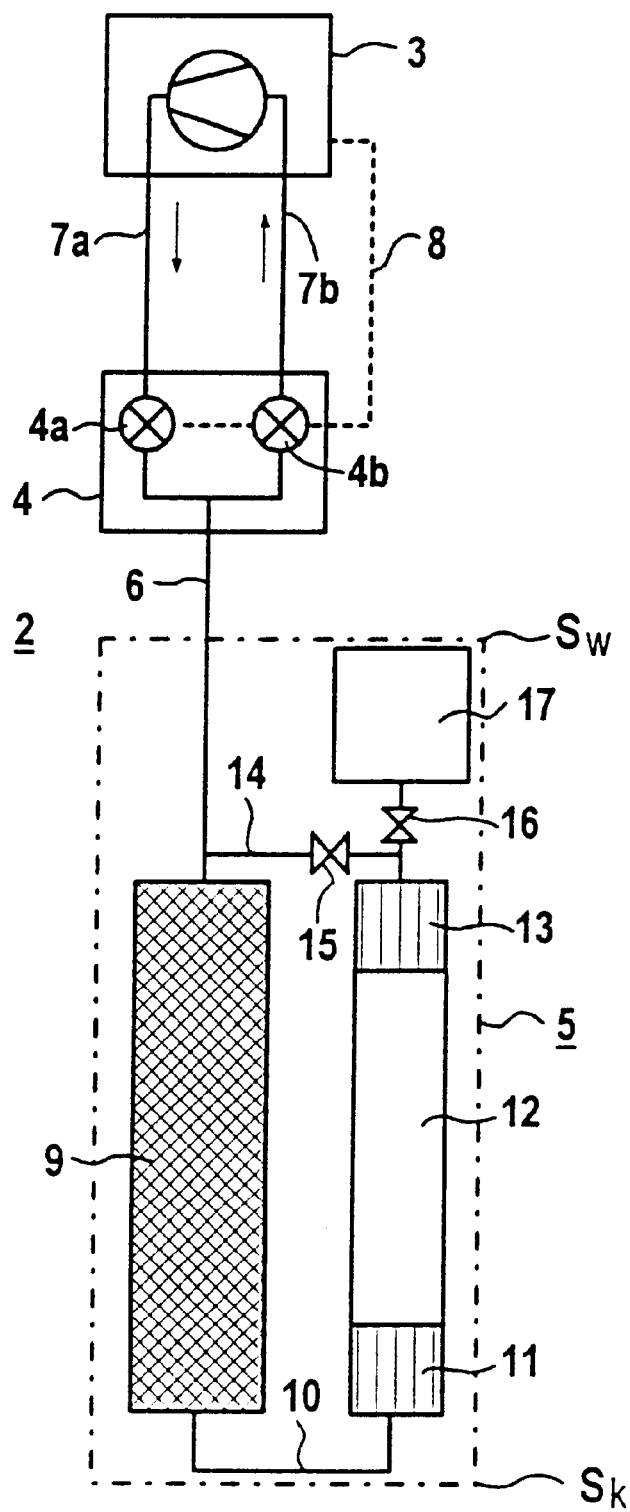

A superconducting device according to one embodiment of the invention, includes a rotating superconducting winding which, in principle, permits the use of LTS or HTS material. The latter material will be selected for the exemplary embodiments below. A refrigeration apparatus for cooling this material contains a regenerative cryocooler which, according to a first embodiment, is a pulse tube cooler. For such a pulse tube cooler, embodiments which are known per se will be assumed (cf. e.g. the aforementioned citation from "Proc. ICEC 16", pages 33 to 44). The basic structure of a particular embodiment of such a pulse tube cooler with a so-called second inlet and a coupled reservoir (buffer) is disclosed e.g. by "Cryogenics", Vol. 30, 1990, pages 514 to 520, and is indicated in FIG. 1.

The pulse tube cooler denoted overall by 2, which is designed for a working gas such as, in particular, He gas, includes the following parts: namely a compressor unit 3, a valve a unit 4, also referred to as a valve mechanism, having valves 4a and 4b, a vertically oriented cold head 5 as well as connection lines 6, 7a and 7b between these parts. The compressor unit 3 delivers high-pressure He gas via a connection line 7a to the valve unit 4, from which low-pressure gas is returned to the compressor unit via a connection line 7b. The valves 4a and 4b in the lines 7a and 7b, respectively, are controlled by electrically operated motors or solenoid valves; the valve unit is electrically connected to the compressor unit. A corresponding control cable is indicated by broken line denoted by 8. Via the connection line 6, the valve device 4 supplies the cold head 5 on its warm side $S_w$ with a gas stream of the working gas, denoted by G, which is switched periodically, e.g. with a frequency of between 1 and 50 Hz, between high and low pressure. During the high-pressure phase, the gas flows through a vertically oriented regenerator tube 9 from the warm side to the cold side $S_k$ of the cold head. The regenerator tube is filled with heat-storing, gas-permeable material, e.g. in the form of stacked metal meshes, beads, sintered bodies or perforated plates. While flowing through the regenerator tube, the working gas is pre-cooled. It then passes through an overflow line 10, located on the cold side $S_k$, and a cold heat exchanger 11, in which heat from the low temperature level can be absorbed, and then flows through a pulse tube 12 running parallel to the regenerator tube 9. The gas expands in this pulse tube, which leads to further cooling. While flowing upward in the pulse tube, the gas warms increasingly and can then release heat outward to a warm heat exchanger 13. A smaller part of the gas flows directly through a second inlet 14 with a nozzle 15 into the pulse tube 12. The heat exchanger 13 is also connected via a nozzle 16 to a buffer volume 17. The nozzles which are shown, and the buffer volume, are used to adjust the gas flow rates and to ensure correct functioning of the pulse tube cooler. In a low-pressure phase, which follows the high-pressure phase described above, expanded gas is re-extracted from the cold head in the reverse direction. The cold side $S_k$ of the cold head 5 is thermally connected to a superconducting winding (not shown).

As a variant of the represented embodiment with two valves 4a and 4b, 4-valve pulse tube coolers are also known, in which the four valves undertake the correct gas flow rate control (cf. U.S. Pat. No. 5,335,505 A). The cold heads may also be constructed in two or more stages (cf. "Cryogenics", Vol. 37, 1997, pages 159 to 164).

Figure 2:
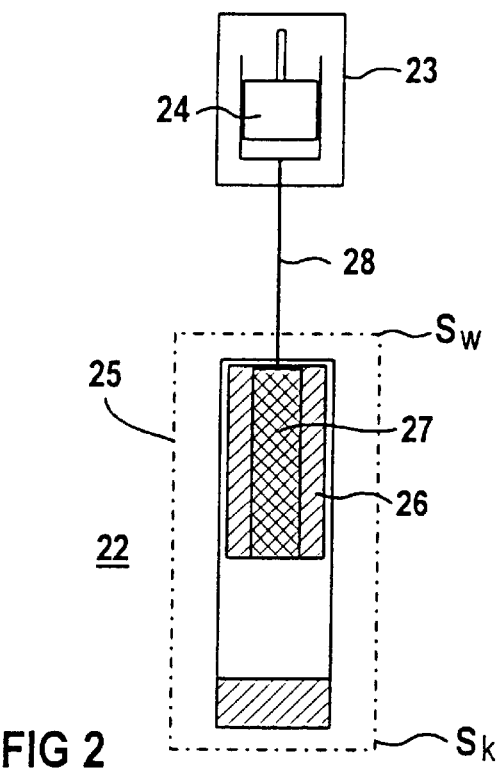

With regard to sealing and reliability of a cold head, an embodiment of a refrigeration unit whose cryocooler is configured as a pulse tube cooler is to be regarded as particularly advantageous for a superconducting device according to the invention. This is because there are no moving parts, e.g. a displacement piston, in the cold head. The measures according to the invention are not, however, restricted to these embodiments of the refrigeration unit. Rather, an embodiment as a split Stirling cooler, which operates with a gas-controlled displacement piston, i.e. does not have a mechanical drive for the piston, is also, in particular, suitable for the cryocooler. A known embodiment of such a cooler (cf. e.g. the book "Stirling-Maschinen-Technik" [Stirling machine technology], ed.: F. Steimle, C. F. Müller Verlag, Heidelberg, 1996, pages 339 to 357, in particular pages 347 to 349) is indicated in FIG. 2 and is denoted by 22. The cooler contains a compressor unit 23 with a working piston 24 as well as a cold head 25. The cold head has a moving gas-controlled displacement piston 26 with a regenerator 27. The compressor unit 23 of the cooler generates a pressure wave with a predetermined working frequency, without any additional valve mechanism being required. Other than a connection line 28, the so-called split line, this type of cooler requires no mechanical connection between the compressor unit and the cold head. This connection line leads to the warm side $S_w$ of the cold head. The cold side $S_k$ of the cold head is thermally connected to the parts of a superconducting winding that are to be cooled.

Figure 3:
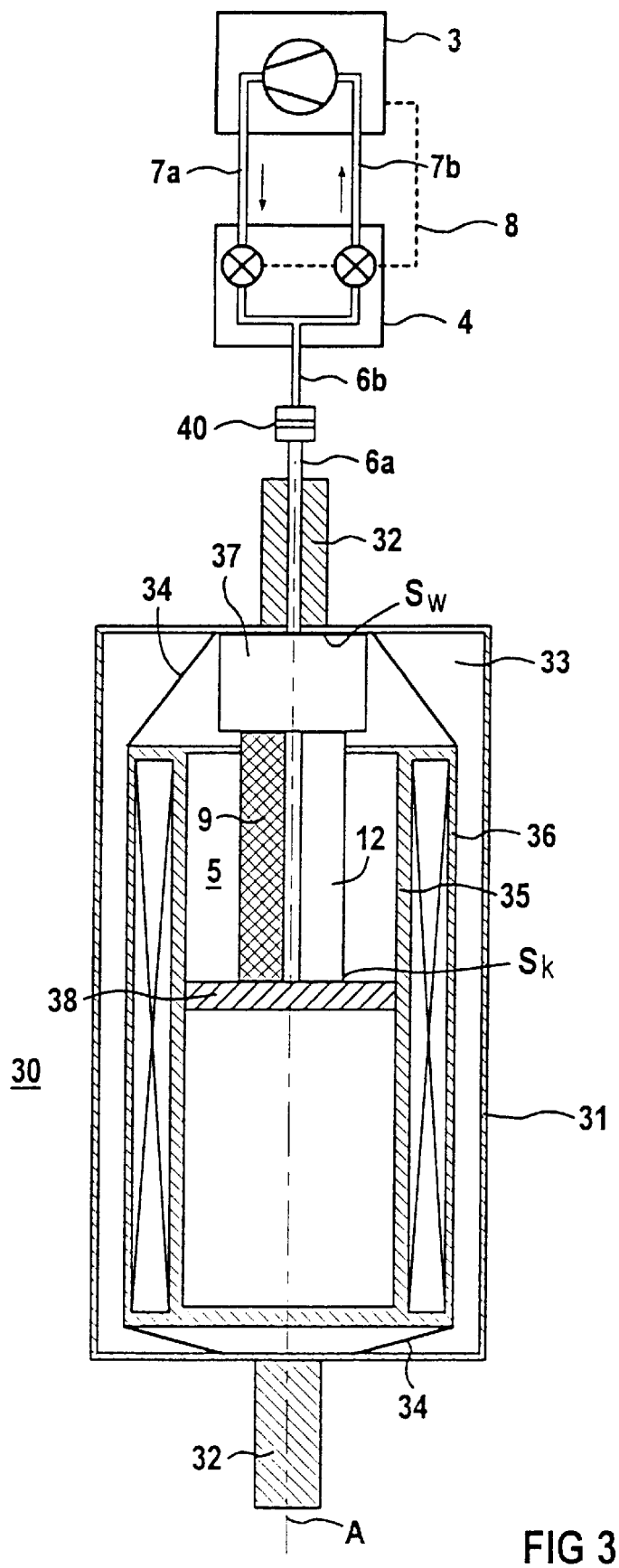

FIG. 3 shows, as a superconducting device according to the invention, the rotor of a synchronous machine with the necessary refrigeration unit. The refrigeration unit is in this case configured as a pulse tube cooler according to FIG. 1. The rotor, denoted by 30, includes a rotating vacuum vessel 31 on a shaft 32 that can be rotated about a rotation axis A. Inside the vacuum vessel, a winding support 35, which is preferably made of a material having a high thermal conductivity and is intended to hold a superconducting winding 36, is fastened to frame elements 34 in at least one vacuum space 33. The winding is intended to be constructed using conductors made of one of the known HTS materials such as e.g. $YBa_2Cu_3O_{7-x}$, $Bi_2Sr_2CaCu_2O_{8+x}$ or $(Bi,Pb)_2Sr_2Ca_2Cu_3O_{10+x}$. The conductors are, in particular, to be kept at a temperature level below 77 K, preferably between 20 and 50 K, for example between 30 and 40 K, by use of the refrigeration unit. To that end, the refrigeration unit includes the pulse tube cooler with a cold head 5 according to FIG. 1, for indirect cooling of the winding 36. Of this cold head, only its regenerator tube 9 and its pulse tube 12 are explained in detail. All other parts located on its warm side $S_w$, with nozzles 15 and 16 and a buffer volume 17 (cf. FIG. 1) are not explained in detail and are referred to as the warm-side head part 37. The cold side $S_k$ of the cold head 5 is thermally connected via at least one heat-contact body 38, a so-called heat bus, to the heat-conducting coil support 35, and hence to the winding 36. From the warm-side head part 37, a gas connection line 6a leads centrally through the shaft 32 to a coupling 40 of a transfer unit (not shown in detail). At this coupling, a working gas G such as, in particular, He gas, is conveyed between rotating and stationary parts. From the coupling, a stationary gas connection line 6a leads to the valve unit 4 and the compressor unit 3 (cf. FIG. 1) of the cooler.

For functionality of the pulse tube cooler, it is particularly advantageous if at least its pulse tube 12 does not lie in a horizontal plane. Therefore, the rotor 30 may preferably be arranged in such a way that its axis A runs vertically. In its interior, it is then straightforward to fit the cold head with a correspondingly oriented pulse tube and regenerator tube.

Refrigerant transfer units for conveying a gaseous or liquid refrigerant are known per se from rotors with windings using conventional (metallic) superconductor material (LTS material) (cf. e.g. "Advances in Cryogenic Engineering", Vol. 23, 1978, pages 125 to 139). These transfer units contain couplings between stationary and rotating parts, which e.g. have ferrofluid seals as sealing means (cf. DE 20 34 213 A). A corresponding embodiment of such a ferrofluid seal in a gas coupling suitable for the superconducting device according to the invention is shown in longitudinal section by FIG. 4. The coupling, denoted by 40, between a rotating gas line 6a, leading to a cold head, at the end of a rotor shaft 32 and a stationary gas line 6b, leading to a valve mechanism, contains a stationary, cup-like sealing housing 41 enclosing the gas line 6b. The tubular side part 41a of this housing encloses a subsection of the rotating gas line 6b while forming an annular clearance 42. For hermetic sealing of this annular clearance, lamellae 44 of a ferrofluid are magnetically held in it. To that end, the corresponding parts of the tubular side part 41a of the sealing housing 41 and/or the opposite parts 45 on or around the rotating connection line 6a are designed with permanent magnetism. The ferrofluid lamellae 44 in the annular clearance 42 reduce the pressure difference between the pulsating working gas of the pulse tube cooler (generally helium gas at from 10 to 20 bar) and the surrounding air. Depending on the design, it is also possible to provide a larger number of lamellae. The figure also illustrates, by arrowed lines, a gas stream G fed via the coupling 40 from the valve mechanism to the cold head. The ferrofluid seal is denoted overall by 47.

Figure 4:
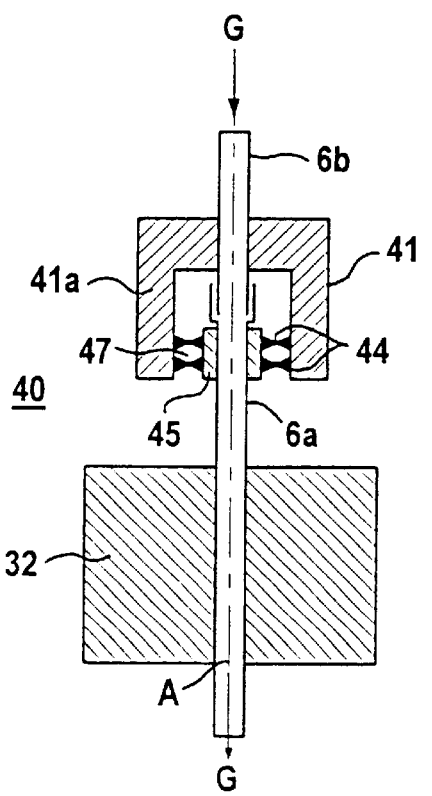
Figure 5:
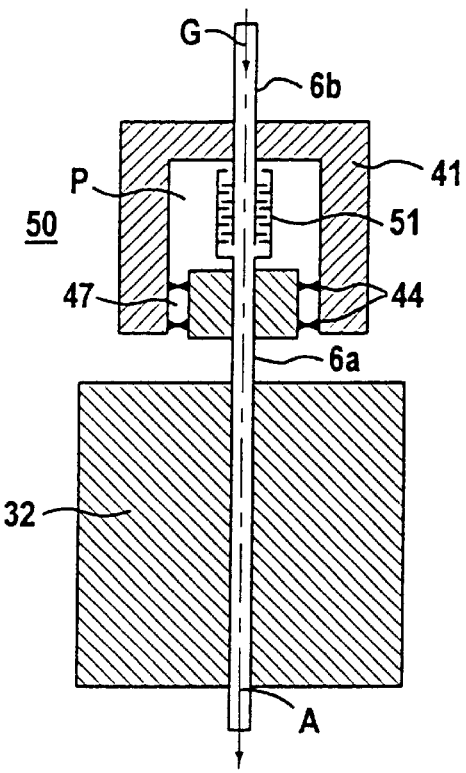
Figure 6:
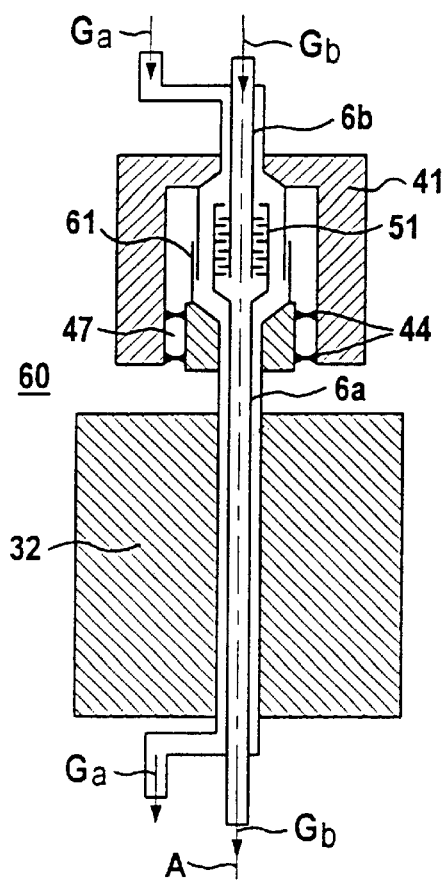

For the gas couplings shown in FIGS. 5 and 6, a representation corresponding to FIG. 4 is selected.

FIG. 5 shows a particularly advantageous refinement of the coupling 40 shown in FIG. 4. Specifically, a labyrinth seal 51 is additionally arranged in front (viewed in the direction from the valve mechanism to the cold head) of the ferrofluid seal 47 with its ferrofluid lamellae 44 in this coupling, which is denoted by 50 in FIG. 5. This labyrinth seal 51 prevents the ferrofluid lamellae from being exposed to the maximum pressure in the high-pressure phase of the cycle of the pulse tube cooler. The labyrinth seal reduces the pressure peaks so that the lamellae receive only an average pressure p of the working gas.

Of course, a coupling of a superconducting device according to the invention may also be configured in such a way that a cold head is connected to two generally concentric gas lines. For instance, in a pulse tube cooler based on the four-valve principle, after its valve mechanism there are still two gas streams to be transmitted to the cold head, but no electrical signals. An embodiment of a gas coupling 60 suitable for this is indicated in FIG. 6. In this case, an outer gas stream $G_a$ is sealed off from the atmosphere by a ferrofluid seal 47. The ferrofluid seal may be preceded by a clearance seal or labyrinth seal in order to absorb pressure peaks of the working gas. The figure shows a corresponding clearance seal 61. In order to seal the two gas streams off from one another, it is also possible to use a clearance 8 seal or a labyrinth seal. In the embodiment which is shown, a labyrinth seal 51 is provided.

The embodiments, shown in FIGS. 3 to 6, of a rotor with an associated refrigeration device, or of gas couplings, were each based on pulse tube coolers as the refrigeration unit. The measures according to the invention are, of course, also suitable for refrigeration units which have other regenerative cryocoolers, in particular a split Stirling cooler. For these coolers, the gas coupling is then located in the gas connection line (split line 25 according to FIG. 2) leading from a compressor unit to the warm side of a cold head.

In the above-selected embodiments of superconducting devices according to the invention, it was assumed that the superconducting winding thereof is constructed with HTS conductors. No limitation to such materials is, however, necessary. This is because, in particular with multistage regenerative cryocoolers, it is even possible to achieve temperature ranges below 20 K, so these may equally well be designed to cool LTS conductors, e.g. NbTi conductors. The superconducting winding may hence also comprise conductors having metallic superconductor material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A superconducting device, comprising:
   a rotor, mounted so as to rotate about a rotation axis and including a winding of conductors including superconductor material; and
   a refrigeration unit, designed for a working gas and including,
      at least one regenerative cryocooler including at least one cold head arranged in the rotor and thermally coupled to the winding, for indirect cooling of the winding,
      a stationary compressor unit located outside the rotor, and
   a transfer unit, arranged between the cold head and the compressor unit, including a sealing device and a gas coupling for conveying the working gas between the stationary and rotating parts,
   wherein a direct connection for the working gas is provided between the gas coupling and the cold head.

2. The device as claimed in claim 1, wherein the cryocooler is at least one of a pulse tube cooler and a split Stirling cooler.

3. The device as claimed in claim 2, wherein the transfer unit includes a gas coupling whose sealing device includes at least one seal selected from the group including: ferrofluid seal, labyrinth seal, and clearance seal.

4. The device as claimed in claim 2, wherein the refrigeration unit includes a plurality of cold heads.

5. The device as claimed in claim 2, wherein the cold head includes a multistage design.

6. The device as claimed in claim 5, wherein the cold head includes two refrigeration stages, the first stage being thermally connected to at least one of an electrical feed and a radiation shield, and the second stage being thermally connected to the superconducting winding.

7. The device as claimed in claim 2, wherein the superconducting winding is kept at a temperature below 77 K via the cold head.

8. The device as claimed in claim 2, wherein the cold side of the cold head is thermally connected to a heat-contact body, via which the indirect cooling of the superconducting winding is carried out.

9. The device as claimed in claim 2, wherein the superconducting winding is arranged in a winding support including a high thermal conductivity.

10. The device as claimed in claim 2, wherein the rotor includes a vertical orientation of the rotation axis.

11. The device as claimed in claim 2, wherein the conductors of the winding include at least one of metallic low-$T_c$ superconductor material and metal oxide high-$T_c$ superconductor material.

12. The device as claimed in claim 1, wherein the transfer unit includes a gas coupling whose sealing device includes at least one seal selected from the group including: ferrofluid seal, labyrinth seal, and clearance seal.

13. The device as claimed in claim 1, wherein the refrigeration unit includes a plurality of cold heads.

14. The device as claimed in claim 1, wherein the cold head includes a multistage design.

15. The device as claimed in claim 14, wherein the cold head includes two refrigeration stages, the first stage being thermally connected to at least one of an electrical feed and a radiation shield, and the second stage being thermally connected to the superconducting winding.

16. The device as claimed in claim 1, wherein the superconducting winding is kept at a temperature below 77 K via the cold head.

17. The device as claimed in claim 1, wherein the cold side of the cold head is thermally connected to a heat-contact body, via which the indirect cooling of the superconducting winding is carried out.

18. The device as claimed in claim 1, wherein the superconducting winding is arranged in a winding support including a high thermal conductivity.

19. The device as claimed in claim 1, wherein the rotor includes a vertical orientation of the rotation axis.

20. The device as claimed in claim 1, wherein the conductors of the winding include at least one of metallic low-$T_c$ superconductor material and metal oxide high-$T_c$ superconductor material.

* * * * *